United States Patent [19]

Agostini

[11] Patent Number: 4,570,254
[45] Date of Patent: Feb. 11, 1986

[54] DRIVE MOTOR HAVING MOVING ROTOR FOR COMPACT DISC PLAYER APPARATUS

[75] Inventor: Louis P. C. Agostini, Leeuw-St-Pierre, Belgium

[73] Assignee: Staar S.A., Brussels, Belgium

[21] Appl. No.: 627,654

[22] Filed: Jul. 3, 1984

[51] Int. Cl.[4] .................. H02K 11/00; G11B 3/60; G11B 25/04

[52] U.S. Cl. .................. 369/270; 310/156; 310/191; 369/266

[58] Field of Search ............... 369/270, 266; 310/156, 310/191, 268

[56] References Cited

U.S. PATENT DOCUMENTS

| | | | |
|---|---|---|---|
| 3,972,535 | 8/1976 | Bleiman | 369/270 |
| 4,063,286 | 12/1977 | Takahara et al. | 369/270 |
| 4,324,994 | 4/1982 | Hager | 310/156 |
| 4,499,573 | 2/1985 | Morinaga | 369/75.2 |

Primary Examiner—Steven L. Stephan
Attorney, Agent, or Firm—Leydig, Voit & Mayer

[57] ABSTRACT

A record disc player apparatus has a frame including an entrance for a disc inserted through the entrance to a loading position, the disc being movable from the loading position to a playing position in an operating plane. A drive spindle mounted perpendicularly relative to the operating plane and aligned with the center of a disc in loading position is driven by a drive motor having a wound stator, a permanent magnet rotor, and a drive shaft mounted for movement axially of the spindle from a disc loading position in which the rotor is offset from the stator to a disc playing position in which the rotor is proximate to and rotated by the magnetic field of the stator. The stator of the motor is formed as a printed circuit on a board. A device moves the rotor, drive shaft and spindle from the disc loading position toward the playing position to an intermediate position and the magnetic field of the stator exerts an electromagnetic force on the rotor for moving the rotor from the intermediate position to the disc playing position and for maintaining the rotor in the disc playing position while the disc is rotated.

9 Claims, 4 Drawing Figures

DRIVE MOTOR HAVING MOVING ROTOR FOR COMPACT DISC PLAYER APPARATUS

TECHNICAL FIELD

The present invention relates to record disc player apparatus and, more particularly, to drive spindles for record disc player apparatus.

BACKGROUND ART

Record disc player apparatus are known having mechanism by which a drive spindle is translated axially in a direction perpendicular to a disc so as to engage the drive spindle with the disc after the disc has been inserted into the apparatus to a loading position. An apparatus of this type, in which the drive motor is bodily movable to engage the spindle with the disc and to move the disc to playing position, is described in U.S. application Ser. No. 485,848 entitled "Moving Drive Spindle For Slot-Type Player Apparatus", now U.S. Pat. No. 4,482,993 issued to Louis P. C. Agostini, Nov. 13, 1984.

DISCLOSURE OF INVENTION

The principal object of the present invention is to improve this type of apparatus by providing a drive motor having a rotor which is axially movable relative to the stator of the drive motor to axially move the drive spindle into drive relation with the disc and the disc to playing position.

A further object is to provide a record disc player apparatus having a drive motor with a wound stator which is fixed on the frame of the apparatus and a permanent magnet rotor which is movable by an independent device from a disc loading position in which the rotor is offset from the stator to an intermediate position and which is movable by electromagnetic force exerted on the rotor by the magnetic field of the stator from the intermediate to the playing position where the rotor is proximate to and rotated by the magnetic field of the stator to rotate the disc at playing speed.

A related object is to locate the disc in playing position with high accuracy, which is very important in playback apparatus for compact record discs which are rotated at high speed and must be located with close clearance relative to a laser reading device.

BRIEF DESCRIPTION OF THE DRAWINGS

Further objects will become evident from the following description taken in conjunction with the accompanying drawings in which.

BEST MODE FOR CARRYING OUT THE INVENTION

Figure 1:
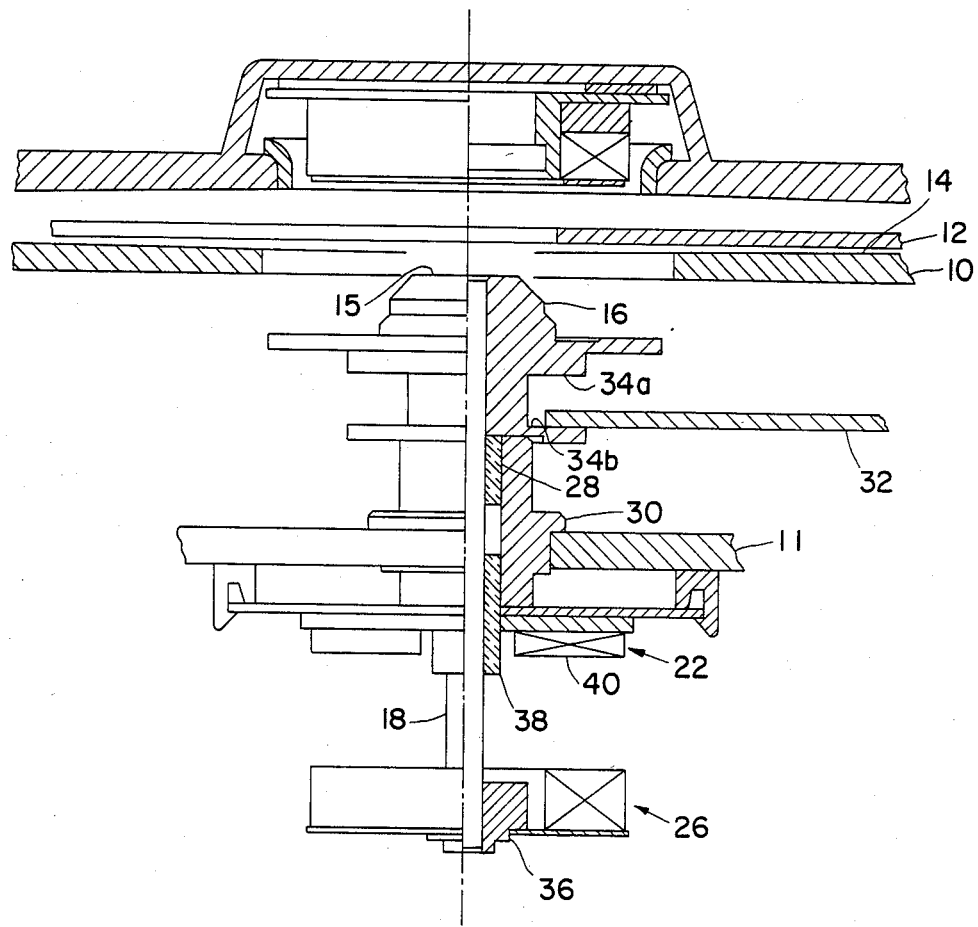
FIG. 1 is a view in cross section illustrating a record disc player apparatus embodying the invention and having a fixed stator and an axially movable rotor and drive spindle shown in a disc loading position.
Figure 3:
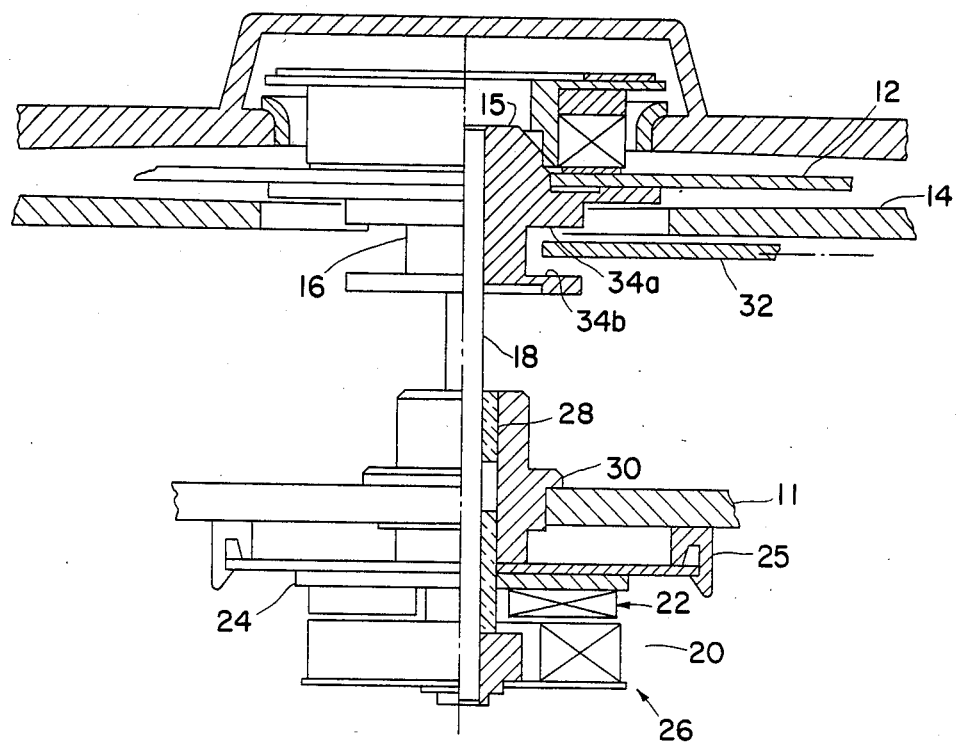
FIG. 3 is a view similar to FIG. 1 with the rotor and drive spindle located in the playing position in drive relation with the disc.

Referring to FIG. 1, a slot-type record disc player apparatus is illustrated particularly, but not exclusively, suited for "compact disc", i.e., CD, records. CD records are rotated at high speed and read by laser detection devices movable radially across the surface of the discs. As shown in FIG. 1, which is a fragmentary view, the apparatus has a frame 10 supported on the main chassis 11 with an entrance for a disc 12 which is inserted through the entrance to a support surface 14 on which the disc 12 rests in loading (or unloading) position until raised to its playing position in an operating plane (FIG. 3). For details as to a slot-type disc record player apparatus with which the present invention may be used, reference is made to commonly assigned U.S. application Ser. No. 441,923 entitled "Slot-Type Disc Recorder And/Or Player Apparatus". In this type of apparatus, the disc 12 is inserted edge-first in its own plane through a slot to the loading position of FIG. 1.

In carrying out this invention, the drive for the disc 12 includes a vertical drive spindle 15 having a drive hub 16 adapted for engagement in the central opening of a disc 12. The drive spindle 15 is mounted for translation axially of the spindle and perpendicularly relative to the operating plane of the disc 12 in playing position which is illustrated in FIG. 3. The drive spindle 15 is connected to the shaft 18 of the drive motor 20 and is herein shown formed as an extension of the motor shaft 18. The drive motor 20 includes a wound stator 22 fixed to the main chassis 11 and is preferably of the type made from a circuit printed on a board 24. The printed circuit board 24 is mounted in position on the main chassis 11 by a clamp 25 so as to fix the position of the stator 22.

In keeping with the invention, the drive motor 20 has a permanent magnet rotor 26 which is connected to the end of the motor shaft 18 opposite from the drive hub 16 and drive spindle 15. The rotor 26 is positioned proximate to the stator 22 in FIG. 3 and when the stator 22 is energized from a power source to produce a magnetic field, the rotor is rotated by the interaction between the permanent magnets of the rotor and the field of the stator. A control circuit (not shown) is connected to control the power supply to the stator windings and obtain the desired speed of rotation, which is variable according to the position of the laser reading device as it moves across the surface of the disc.

In the disc loading position of FIG. 1, the rotor 26 is remote from the stator 22. Means are provided for mounting the rotor 26, motor shaft 18 and drive spindle 15 for movement axially of the drive spindle 15, herein shown as bearings 28 which are held by a guide member 30 on the main chassis 11, the motor shaft 18 being axially and rotatably supported by the bearings 28. In the position shown in FIG. 1 with the rotor 26 remote from the stator 22, the drive spindle 15 and drive hub 16 are in the disc loading position clear of any interference with the disc 12 as it is loaded edgewise to the playing position with its central opening aligned axially with the drive spindle 15 and drive hub 16.

Figure 2:
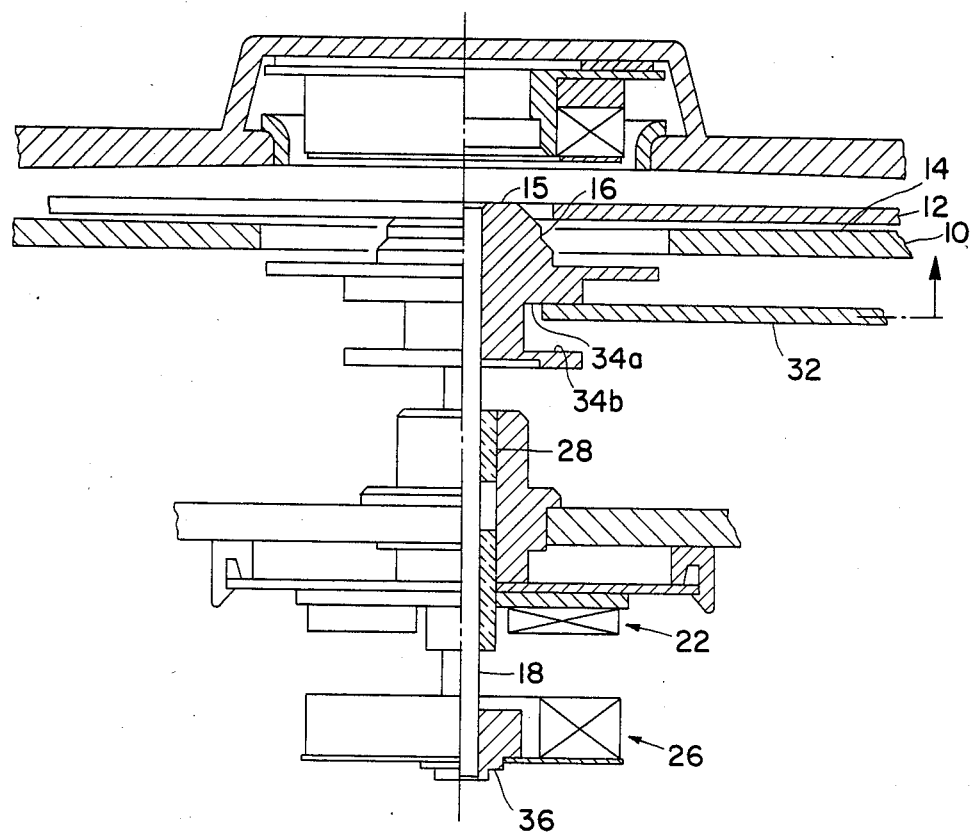
FIG. 2 is a view similar to FIG. 1 with the rotor and drive spindle being moved toward the playing position from the disc loading position of FIG. 1 and located in an intermediate position.

In carrying out the invention, a device 32, herein shown as a cam driven actuator, is engagable with the edges 34a, 34b of a circular slot 34 in the drive hub 16 to shift the rotor 26, motor shaft 18 and spindle 15 axially. Thus, the drive hub 16 and spindle 15 are movable axially by the cam driven actuator device 32 from the disc loading position of FIG. 1 toward the playing position of FIG. 3. For this purpose, the cam driven actuator device 32 is moved against the edge 34a of the slot 34, as shown in FIG. 2, and mechanically moves the drive hub 16 and spindle 15 axially, which causes the rotor 26 to move relatively closer to the stator 22 to the intermediate position of FIG. 2. With the stator energized from a power source, the permanent magnets of the rotor 26 come within the flux field of the windings of the stator 22 when the rotor 26 approaches the stator and attains the intermediate position depicted in FIG. 2.

In accordance with the invention, the field windings of the stator 22, which are formed as a printed circuit on the board 24, are wound to produce a magnetic field which causes the permanent magnet rotor 26 to rotate when the rotor 26 is proximate to the stator 22 (FIG. 3) and the stator 22 is energized from a suitable power source. The magnetic field of the stator 22 linking the rotor 26 exerts an electromagnetic force due to the interaction with the permanent magnets of the rotor 26 which, independently of the device 32, biases the rotor 26 in an axial direction toward the stator 22 from the intermediate position (FIG. 2) to the playing position (FIG. 3) in which the rotor 26 is proximate to the stator 22. As the rotor 26 moves axially to the disc playing position, the hub 36 of the rotor 26 comes against the end face 38 of the bearing 28 which provides an abutment to accurately position the rotor 26 proximate to the stator 22 and the motor shaft 18, the drive spindle 15, and drive hub 16 for the disc 12 in the disc playing position. This is highly important since the disc 12 is rotated at high speed in CD apparatus and should be located and maintained very accurately in playing position in an operating plane with close clearance to a laser reading device. In record disc player apparatus where the entire motor is movable to move the spindle into drive relation with the disc, powerful cams are required to provide and maintain the thrust to hold the motor against a stop whereas, with the present invention, the electromagnetic force from the flux of the stator windings linking the permanent magnets of the rotor 26 urges the rotor 26 towards the stator 22 and holds the rotor hub 36 against the end face 38 of the bearing 28. In this position of the rotor 26 the permanent magnets of the rotor are spaced from the plane of the surface 40 of the printed circuit board 24 but are within the field of the stator windings and interact with the stator field, both to rotate the rotor and bias it axially. It will also be noted that the electromagnetic force has moved the drive hub 16 to a position where the cam driven actuator device 32 is in the center of the slot 34 clear of the edges 34a, 34b and eliminating any frictional forces due to drag as the drive hub 16 is rotated by the motor 20 (see FIG. 3).

Figure 4:
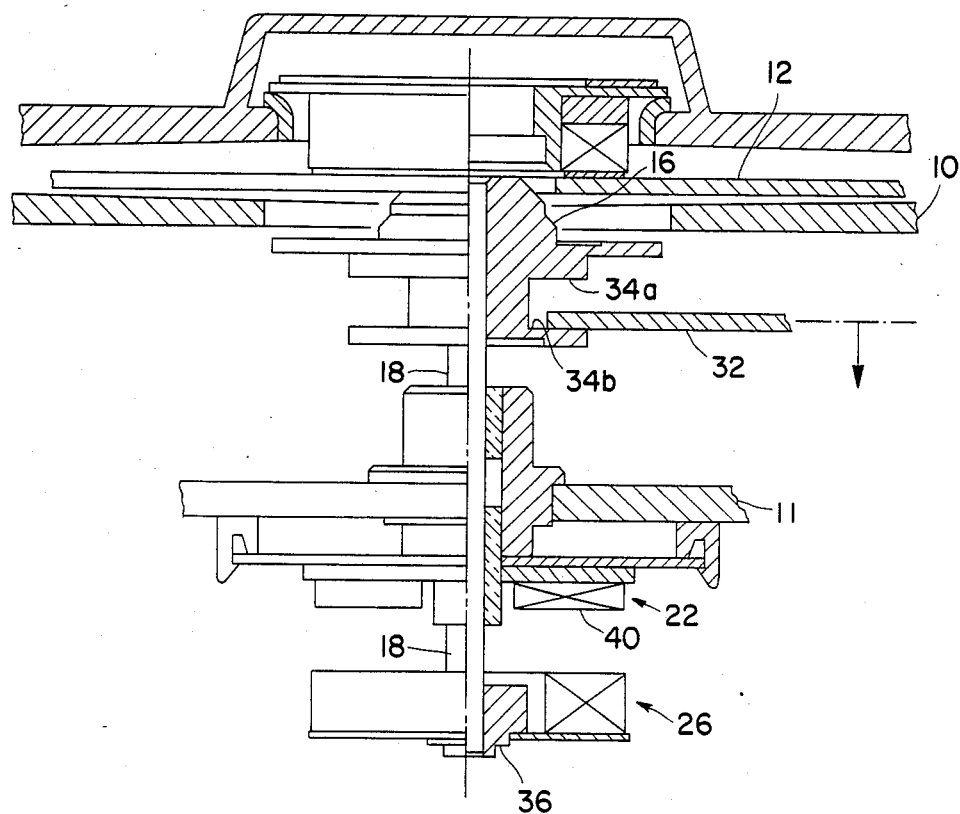
FIG. 4 is a view similar to FIG. 2 with the rotor and drive spindle being moved from the playing position toward the disc loading position and being located in an intermediate position.

In order to hold the disc 12 securely on the drive hub 16, a clamp mechanism is provided, preferably a magnetic clamp of the type shown in commonly assigned U.S. application Ser. No. 457,360 entitled "Disc Player Having Self-Actuated Magnetic Clamping Device". With this type of clamp mechanism, the clamp is self-levitating to the position of FIG. 1 when the drive hub 16 is in the disc loading position and is driven magnetically to the clamping position when the drive hub 16 is brought into flux-linking relationship as it approaches the playing position of FIG. 3. Similarly, as the drive hub 16 is translated away from the playing position toward the disc loading (or unloading) position by the cam driven actuator device 32, as shown in FIG. 4, the clamp is separated from the drive hub 16 and eventually levitates to its loading position (FIG. 1) as the drive hub 16, drive spindle 15 and rotor 26 are shifted to the disc loading (or unloading) position.

In a prototype of the invention the rotor and printed circuit stator were used of a motor manufactured by Sony Corporation, Ref. DC-DHR 2600R, which has four stator windings and a speed range of 200-600 RPM. Neither the housing nor the shaft guide of the Sony motor was used. According to applicant's invention, the printed circuit board on which the stator is printed is clamped to the chassis, as shown in FIGS. 1-4. These Figures diagrammatically illustrate the motor, stator windings and rotor construction.

Other types of motors may be used, a motor of the same general type with printed circuit stator and ring type permanent magnet rotor being shown in Hager, U.S. Pat. No. 4,324,994, to which reference may be made for details of construction and speed control circuits for such motors.

I claim:

1. In a record disc player apparatus having a frame including an entrance for a disc inserted through said entrance to a loading position, said disc being movable from the loading position to a playing position in an operating plane:
    a drive spindle mounted perpendicularly relative to said plane and aligned with the center of a disc in loading position;
    a drive motor having a wound stator fixed in relation to said frame and adapted to be energized from a power source to produce a magnetic field, a permanent magnet rotor, and a drive shaft connected to said rotor and supporting said spindle;
    means mounting said rotor, drive shaft and spindle for movement axially of said spindle from a disc loading position in which said rotor is remote from said stator to a disc playing position in which said rotor is proximate to, within the influence of, and rotated by the magnetic field of said stator;
    a power driven device for moving said rotor, drive shaft and spindle from said disc loading position toward said playing position to an intermediate position in which said rotor is within the influence of the magnetic field of said stator;
    stop means for spacing said rotor at a fixed distance from said stator in said playing position; and
    means employing the magnetic field of said stator magnetically attracting said rotor for moving said rotor, drive shaft and spindle from said intermediate position to said disc playing position independently of said device, and for maintaining said rotor, drive shaft and spindle in said disc playing position determined by said stop means while said disc is rotated by the rotor.

2. A record player apparatus according to claim 1 wherein means mounting said rotor, drive shaft and spindle include a fixed bearing rotatably supporting said drive shaft, said fixed bearing having an end face providing an abutment to position said rotor proximate to said stator.

3. A record player apparatus according to claim 1 wherein said spindle is an extension of said drive shaft, said rotor has a hub, and said drive shaft is connected to the center of the rotor hub.

4. A record player apparatus according to claim 3 wherein said stator is provided by a printed circuit on a surface of a board and the permanent magnets of said rotor are spaced from the plane of said surface of said board when said rotor is proximate to for rotation by the magnetic field of said stator.

5. In a record disc player apparatus having a frame for supporting a disc in a loading position, said disc being movable from the loading position to a playing position in an operating plane:
- a drive spindle mounted perpendicularly relative to said plane and aligned with the center of a disc in loading position;
- a drive motor having a wound stator fixed in relation to said frame and adapted to be energized from a power source to produce a magnetic field, and a rotor connected to said spindle;
- means mounting said rotor and spindle for movement axially of said spindle from a disc loading position in which said rotor is remote from said stator to a disc playing position in which said rotor is proximate to and rotated by the magnetic field of said stator;
- power driven means for moving said rotor from said loading position to an intermediate position closer to said stator and within the influence of the magnetic field of said stator;
- stop means for spacing said rotor at a fixed distance from said stator in said playing position; and
- means employing the magnetic field of said stator attracting said rotor for moving said rotor closer to said stator to said disc playing position.

6. A record player apparatus according to claim 5 wherein said means mounting said rotor, and spindle includes a fixed bearing having an end face providing an abutment to position said rotor proximate to said stator.

7. A record player apparatus according to claim 5 wherein said rotor has a drive shaft connected to said spindle, said rotor has a hub, and said drive shaft is connected to the center of the rotor hub.

8. A record player apparatus according to claim 7 wherein said stator is provided by a printed circuit on a surface of a board and the permanent magnets of said rotor are spaced from the plane of said surface of said board when said rotor is proximate to for rotation by the magnetic field of said stator.

9. In a record disc player apparatus having a frame for supporting a disc in a playing position in an operating plane:
- a drive spindle mounted perpendicularly relative to said plane and aligned with the center of a disc in loading position;
- a drive motor having a wound stator fixed in relation to said frame and adapted to be energized from a power source to produce a magnetic field, a permanent magnet rotor, and a drive shaft connected to said rotor and supporting said spindle;
- means mounting said rotor, drive shaft and spindle for movement axially of said spindle from a disc loading position in which said rotor is remote from said stator to a disc playing position in which said rotor is closer to, within the influence of, and rotated by the magnetic field of said stator; and
- means employing the magnetic field of said stator when said rotor is within the influence thereof for magnetically attracting said rotor and moving said rotor, drive shaft and spindle at least partially to said disc playing position and for maintaining said rotor, drive shaft and spindle in said disc playing position while said disc is rotated by the rotor.

* * * * *